United States Patent [19]

Rueggeberg

[11] 4,291,226

[45] Sep. 22, 1981

[54] CORONA DISCHARGE ELECTRODE SYSTEM

[75] Inventor: Werner Rueggeberg, Lancaster, Pa.

[73] Assignee: Armstrong Cork Company, Lancaster, Pa.

[21] Appl. No.: 128,540

[22] Filed: Mar. 10, 1980

[51] Int. Cl.[3] .................... H01T 19/04; G01M 21/01

[52] U.S. Cl. .................................... 250/324; 204/164; 250/326; 250/432 R

[58] Field of Search ............................... 250/324-326, 250/306, 309; 427/13, 39; 204/1.5, 164; 264/25; 118/621

[56] References Cited

U.S. PATENT DOCUMENTS

| | | | |
|---|---|---|---|
| 2,458,320 | 1/1949 | Unschuld . | |
| 3,308,045 | 3/1967 | Sullivan | 250/325 |
| 3,396,308 | 8/1968 | Whitmore | 250/326 |
| 3,484,363 | 12/1969 | Williams . | |
| 3,654,108 | 4/1972 | Smith | 204/164 |
| 3,794,839 | 2/1974 | Hayne | 250/324 |
| 4,051,044 | 9/1977 | Sorensen | 250/325 |
| 4,153,560 | 5/1979 | Dinter et al. | 204/164 |
| 4,159,425 | 1/1979 | Lowther . | |

*Primary Examiner*—Harold A. Dixon

[57] ABSTRACT

A corona discharge electrode system is provided, the electrode system providing a power density of up to 200 watts per square inch by use of a liquid cooled, liquid-quartz buffered electrode. The corona discharge electrode system is particularly suitable for deglossing radiant energy curable coatings.

9 Claims, 2 Drawing Figures

CORONA DISCHARGE ELECTRODE SYSTEM

This invention relates to a corona discharge electrode system.

In one of its more specific aspects, this invention relates to a corona discharge electrode system capable of sustaining a power density of up to 200 watts per square inch. The corona discharge electrode is particularly well suited for deglossing coatings curable by radiant energy.

The application of wear resistant coatings to floor covering materials is well known. Usually these coatings provide abrasion resistance and impart a high gloss appearance to the floor covering material. The abrasion resistance provided by these coatings is always a desirable property. However, the high gloss appearance is not always desirable, especially in high wear and thus high maintenance floor areas. Accordingly, the floor covering industry is continually looking for new ways to control the gloss level of these coatings.

Prior art methods of reducing gloss or flatting typically involve the employment of various particulate flatting agents in the wear coating compositions. The use of flatting agents has been generally unsatisfactory since their use results in deglossed coatings which exhibit a reduction in other physical properties. Another method known in the art is steam deglossing (see Ser. No. 922,308, now U.S. Pat. No. 4,197,344 filed July 6, 1978).

According to this invention, there is provided a liquid cooled, liquid-quartz buffered corona discharge electrode system capable of sustaining a power density of up to 200 watts per square inch comprising:

(a) a cylindrical electrode;

(b) a quartz tube of larger diameter than the electrode, encasing the electrode and providing a cylindrical passageway between the surface of the electrode and the inside wall of the quartz tube, the quartz tube having at one end a liquid inlet means and at the other end a liquid outlet means for the passage of a liquid buffer dielectric/coolant whereby the liquid buffer dielectric/coolant is supplied through the inlet means, passes through the cylindrical passageway in contact with the surface of the electrode and exits through the outlet means;

(c) a plurality of spacer means interposed between the electrode and the inside wall of the quartz tube serving to hold the electrode stationary in the quartz tube whereby the electrode is prevented from deflecting due to the electrical forces generated during corona formation; and, (d) a ground electrode means positioned parallel to and spaced a distance apart from the quartz tube forming therebetween a corona discharge region wherein a material to be treated is passed.

While the corona discharge device of this invention is suitable for corona treatment of any materials, it has been found to be particularly suitable, due to its high power capability of up to 200 watts per square inch and its design, for deglossing coatings curable by radiant energy or a combined radiant energy and moisture cure which coatings are superimposed on semi-rigid or even rigid materials.

The electrode system of this invention will be more easily understood if explained in conjunction with the drawings in which.

Figure 2:
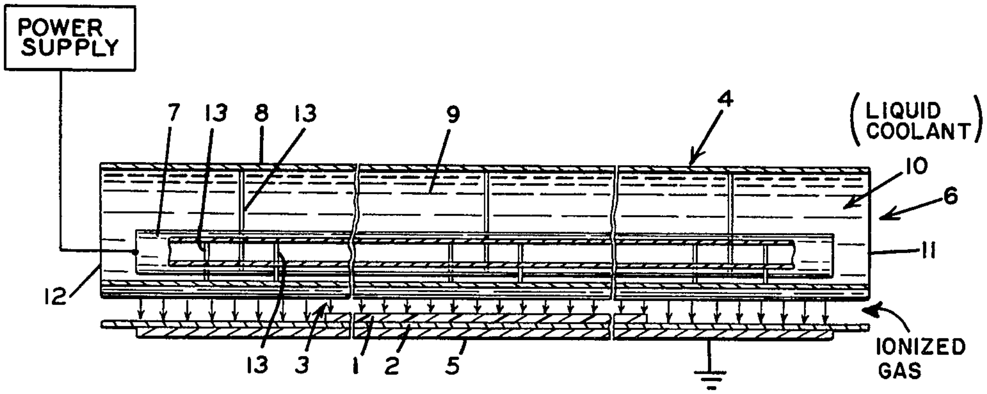
FIG. 2 depicts a front view in cross section of the electrode system of this invention.

Referring now to FIG. 2, there is shown material to be treated 1, carried on means for moving 2 which can be any suitable non-conductive conveyors system, and passing through corona discharge region 3.

Corona discharge region 3 is the region between liquid-quartz buffered electrode 4 and ground electrode 5 which are the two principal parts forming the corona discharge electrode system 6.

Liquid-quartz buffered electrode 4 is comprised of cylindrical electrode 7 encased in quartz tube 8. Quartz tube 8 is of a sufficient diameter to create cylindrical passageway 9 between the surface of cylindrical electrode 7 and the inside diameter of the quartz tube for the passage of a liquid buffer dielectric/coolant 10.

Cylindrical electrode 7 is held in position in quartz tube 8 by means of a plurality of spacer means 13. The spacer means must be constructed of a nonmetal electrical insulating material and must facilitate the free flow of the liquid buffer dielectric/coolant through the cylindrical passageway.

Quartz tube 8 has at one end inlet means 11 and at its other end outlet means 12. The liquid buffer dielectric/coolant 10 enters cylindrical passageway 9 through inlet means 11, passes through cylindrical passageway 9 in contact with cylindrical electrode 7 and exits by way of outlet means 12.

Ground electrode 5 can be of any suitable shape; for example, an elongated plate of about the same length as the cylindrical electrode and is positioned parallel to and a space distance apart from buffered electrode 4 forming therebetween corona discharge region 3. If a material to be treated is carried on a conveyor belt, such as, for example, a 1/32 inch thick silicon rubber belt 2, ground electrode 5 is, as shown in the drawing, positioned adjacent the side of the belt facing away from the tile, such that, the belt rides over the ground electrode. The distance between the bottom of the buffered electrode and the top surface of ground electrode is such that the gap between the surface of the material to be treated and the bottom of the quartz tube will typically be within the range of from about 0.02 to about 0.25 inch, preferably, 0.03 to about 0.125 inch.

In the operation of the invention, as a material to be treated 1, in this instance a filled vinyl floor tile having on its surface an uncured wear coating curable by radiant energy passes through corona discharge region 3, the region is flooded with a gas to be ionized. The liquid-quartz buffered electrode 4 is connected to a high-frequency, high voltage A.C. electrical power supply, and the gas in the corona discharge region is partially ionized forming a corona discharge which treats the wet, uncured coating on the tile as the tile is passed through the corona discharge region. After being treated with the corona discharge, the coating on the surface of the tile is bulk cured by radiant energy. After bulk cure the coated tile exhibits a deglossed surface.

The buffered electrode 4 can be made of any suitable conductive metal encased in a quartz tube.

A copper tube having an outside diameter of about ¼ inch and a length of about 29 inches encased in a quartz tube having a wall thickness of about 0.04 inch, an outside diameter of about 0.60 inch and a length of about 30 inches has been found satisfactory for use in deglossing uncured wear coatings on floor tile.

The cylindrical passageway formed between the copper tube electrode and the quartz tube serves to facilitate a generous flow of liquid buffer dielectric/coolant through the cylindrical passageway in contact with the electrode.

Figure 1:
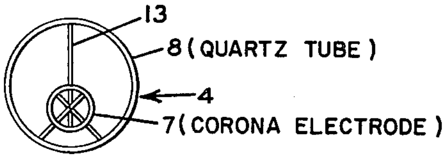
FIG. 1 depicts an end view of the electrode of this invention.

Preferably, the copper tube electrode is positioned off center in the bottom of the quartz tube, as shown in FIG. 1. This reduces the gap between the electrodes and thus reduces the voltage required to form the corona. However, the copper tube electrode when positioned less than 2 mm from the inside surface of the quartz tube has been found to obstruct good dielectric/-coolant flow. Any suitable liquid buffer dielectric/coolant can be employed. Preferably the dielectric/coolant is selected, through its dielectric constant, to optimize the corona activity of the gas to be ionized.

The dielectric constant of the liquid buffer dielectric/coolant has been found to control significantly the resulting corona activity. The higher the dielectric constant of the coolant, the greater the ionization activity generated at a given applied electrode voltage. Confinement and shaping of the corona discharge has been found to also be affected by the dielectric properties of the coolant. Easily ionizable gases such as argon and helium were found to develop more usefully formed corona discharges with low dielectric constant (2-3) coolants such as mineral or hydrocarbon transformer oils, whereas gases that are more difficult to ionize such as carbon dioxide or the freons were found to form better corona discharges with high dielectric constant (30-40) coolants such as ethylene glycol or glycerine.

The use of water as a coolant has not been found suitable for use because of its high dielectric constant value which is known to be of the order of 80 at the frequencies and temperature of use. This dielectric property of water has been found to cause the corona discharges to be sparky, coarse and poorly formed or confined thus virtually prohibiting any definitive quality that may be assigned to a particular corona discharge.

In the operation of the corona discharge device of this invention, the dielectric strength of the liquid buffer dielectric/coolant is considerably enhanced by its movement through the passageway at an average velocity flow of from about 20 to about 30 inches/sec. which flow serves to remove the coolant at the instant any faulty region develops in the corona discharge electrode system.

The ground electrode is also of any suitable conductive material. The size of the ground electrode is critical only in the sense that its length and width determine the length and width of the corona discharge. An aluminum ground electrode having a length of about 5 inches and a width of about 14 inches has been found satisfactory for use in a system for treating floor tile using two buffered electrodes positioned immediately adjacent and parallel to each other at a center line separation of about 2 inches.

The spacer means 13 can be any nonmetal spacers suitable to hold the electrode in place during operation and arranged to provide a suitable liquid buffer dielectric/coolant flow velocity through the cylindrical passageway. The use of sets of three Teflon rods, each rod having a diameter of about 0.06 inch, to lengthwise position the bottom of the cylindrical electrode about 2 to 3 mm from the inside diameter of the quartz tube has been found suitable for use. Each rod is affixed to the copper tube by inserting one end of the rod through a hole in the copper tube of the same diameter as the rod and resting that end against the inside wall of the tube. The other end of the rod rests against the inside wall of the quartz tube. The orientation of each set of three rods to position the electrode, as shown in FIG. 1 (the smaller two rods are about 90° apart), has been found satisfactory as has the lengthwise positioning of sets of rods at a separation of three to four inches from each other. This separation was found satisfactory to prevent the copper tube electrode from deflecting because of the electrical forces that are generated during corona formation.

It will be evident from the foregoing that various modifications can be made to this invention. Such, however, are considered to be within the scope of this invention.

What is claimed is:

1. A liquid cooled, liquid-quartz buffered corona discharge electrode system capable of sustaining a power density of up to 200 watts per square inch comprising:

(a) a cylindrical electrode;

(b) a quartz tube of larger diameter than the electrode, encasing the electrode and providing a cylindrical passageway between the surface of the electrode and the inside wall of the quartz tube, the quartz tube having at one end a liquid inlet means and at the other end a liquid outlet means for the passage of a liquid buffer dielectric/coolant whereby the liquid buffer dielectric/coolant is supplied through the inlet means, passes through the cylindrical passageway in contact with the surface of the electrode and exits through the outlet means;

(c) a plurality of spacer means interposed between the electrode and the inside wall of the quartz tube serving to hold the electrode stationary in the quartz tube whereby the electrode is prevented from deflecting due to the electrical forces generated during corona formation; and, (d) a ground electrode means positioned parallel to and spaced a distance apart from the quartz tube forming therebetween a corona discharge region including a gas wherein a material to be treated is passed.

2. The liquid cooled, liquid-quartz buffered corona discharge electrode system of claim 1 in which said gas is easily ionized and said liquid buffer dielectric/coolant is selected to have a dielectric constant of from about 2 to about 3.

3. The liquid cooled, liquid-quartz buffered corona discharge electrode system of claim 2 in which said liquid buffer dielectric/coolant is a mineral or hydrocarbon transformer oil.

4. The liquid cooled, liquid-quartz buffered corona discharge electrode system of claim 1 in which said gas is not easily ionized and said liquid buffer dielectric/-coolant is selected to have a dielectric constant of from about 30 to about 40.

5. The liquid cooled, liquid-quartz buffered corona discharge electrode system of claim 4 in which said liquid buffer dielectric/coolant is ethylene glycol or glycerine.

6. The liquid cooled, liquid-quartz buffered corona discharge electrode system of claim 1 in which said liquid buffer dielectric/coolant is supplied through the cylindrical passageway at an average velocity flow of from about 20 to about 30 inches per second.

7. The liquid cooled, liquid-quartz buffered corona discharge of claim 1 in which the bottom of said cylindrical electrode is positioned at least 2 mm from the inside surface of the bottom of the quartz tube.

8. The liquid cooled, liquid-quartz buffered corona discharge of claim 1 in which the bottom of said quartz tube is from about 0.02 to about 0.25 inch from the surface of the material to be treated.

9. The liquid cooled, liquid-quartz buffered corona discharge of claim 1 in which said plurality of spacer means are sets of three nonmetal electrical insulating rods, each set positioned from about 3 to about 4 inches apart.

* * * * *